United States Patent [19]
Yoshibe et al.

[11] Patent Number: 5,185,622
[45] Date of Patent: Feb. 9, 1993

[54] ELECTRIC CONNECTING APPARATUS FOR CAMERA SYSTEM

[75] Inventors: Koushi Yoshibe, Yokohama; Yoshiro Kodaka, Tokyo, both of Japan

[73] Assignee: Nikon Corporation, Tokyo, Japan

[21] Appl. No.: 717,082

[22] Filed: Jun. 18, 1991

[30] Foreign Application Priority Data

Jun. 21, 1990 [JP] Japan .................................. 2-64942

[51] Int. Cl.⁵ ............................................ G03B 17/00
[52] U.S. Cl. .................................................... 354/286
[58] Field of Search ........................................ 354/286

[56] References Cited

U.S. PATENT DOCUMENTS 4,922,283  5/1990  Fukui .............................. 354/286 X

FOREIGN PATENT DOCUMENTS 62-140528  9/1987  Japan .

Primary Examiner—Michael L. Gellner
Assistant Examiner—Howard B. Blankenship
Attorney, Agent, or Firm—Shapiro and Shapiro

[57] ABSTRACT

An electric connecting apparatus for a camera system in which a photographic lens is mounted to a camera body by angular attachment movement through a specified range, comprises, on each of the lens and the body, a movable contact unit and a relatively fixed contact unit. The contact units of each of the lens and the body extend circumferentially over a total angular range that exceeds the attachment movement angle. The contact units of the lens are disposed to avoid interference with portions of the camera body and the contact units of the camera body are disposed to avoid interference with portions of the lens during mounting of the lens.

15 Claims, 7 Drawing Sheets

ELECTRIC CONNECTING APPARATUS FOR CAMERA SYSTEM

BACKGROUND OF THE INVENTION

1. Field of the Invention

This invention relates to an electric connector for a camera system and more particularly to an electric connector for a camera system for electrically connecting between a camera body and a photographic lens which constitute the camera system and are rotary-detachable to each other, and electric elements mounted to a camera accessory.

2. Related Background Art

Conventionally, an electric connector for a photographic lens was composed of a contact unit which was provided within a range not exceeding an angle of rotation in rotatively mounting the photographic lens to the camera body. Therefore, the electric connector for the camera body and the camera accessory was also likewise composed of the contact unit which was provided within a range not exceeding an angle of rotation.

Conventionally, as disclosed in Japanese Laid-Open Utility Model Application No. 62-140528, and as shown in a cross section for its contact unit in FIG. 6, a housing unit (101a, 101b) was provided with a plurality of cylindrical, concave holes (102) in the radiating direction from the optical axis. In each concave hole (102), a contact member (103a) for having an elasticity to project its head in the radiating direction outward energized in the radiating direction outward, and a circuit substrate (108) for electrically connecting therewith were inserted.

When mounted to the camera body as shown in a transverse sectional view showing a state when mounted in FIG. 8, the contact member (103a) on the photographic lens side was pressed against a contact member (113) on the camera body side by the energizing force for connection so that a communication was conducted between the camera body and the photographic lens.

Since, however, electronic improvement of the camera system has advanced, types of the accessories have increased, and information to be exchanged between the camera body and the photographic lens has remarkably increased, it has been recently requested to increase the numbers of each contact.

When contact units of conventional types are used and their number is increased in order to widely secure the interchangeability between conventional camera bodies and photographic lenses, it has become necessary to provide the contact units in a range beyond the angle of rotation in mounting.

When, however, the contact unit is provided beyond the angle of rotation in mounting, the contact unit on the photographic lens side projecting in the radiating direction comes into contact with the housing of the contact unit on the camera body side during mounting, or the above-mentioned contact likewise occurs to the contact unit on the camera body side, and there was a problem that mounting could not be smoothly made.

As regards the contact unit energized in the radiating direction, when attempting to forcibly mounting by obliquely inserting with the mount surface tilted on mounting the photographic lens, the contact unit will be damaged.

SUMMARY OF THE INVENTION

It is an object of the present invention to smoothly mount a photographic lens, to the camera body, having an electric connector consisting of a contact unit provided in a range beyond the angle of rotation in mounting so that normal communications are obtained between the electric elements of the two.

To solve the above problem, in an electric connecting apparatus for a camera system according to the present invention, consisting of a camera body and a photographic lens, wherein the respective mount surfaces of the two stand opposite each other for abutment, are removably secured by relatively rotating at a specified angle, and their electric contact units are electrically connected by mutually abutting, the electric connecting apparatus for a camera system has been constructed, wherein the camera body has a body-side housing (11) having a notch (15c) formed along the circumferential direction of its mount surface, a body-side movable contact unit (14) provided outside the range of the angle of rotation at the body-side housing (11), and a body-side fixed contact unit (13) provided within the range of the angle at the body-side housing (11), the photographic lens has a lens-side housing (1) having a notch (5c) formed along the circumferential direction of its mount surface, a lens-side movable contact unit (3) provided within the range of the angle in rotatively mounting at the lens-side housing (1), and a lens-side fixed contact unit (4) provided outside the range of the angle at the lens-side housing (1), when the mount surface of the photographic lens stands opposite each other to that of the camera body for abutment, and the photographic lens and the camera body are in positions where both do not relatively rotate for mounting, the body-side movable contact unit (14) stands opposite each other to the notch (5c) of the lens-side housing, the body-side fixed contact unit (13) stands opposite each other to the lens-side fixed contact unit (4), the notch (15c) of the body-side housing stands opposite each other to the lens-side movable contact unit (3), and both do not interfere with each other, and when the photographic lens and the camera body are in positions where both have been mounted by relatively rotating, the body-side movable contact unit (14) abuts on the lens-side fixed contact unit (4), the body-side fixed contact unit (13) abuts on the lens-side movable contact unit (3).

An electric connecting apparatus between the photographic lens and camera body has been likewise constructed.

When allowing the respective notches in the housing of the electric connector for both the photographic lens and the camera body to stand opposite each other during mounting, the lens-side movable contact unit (3) with a large amount of projection of the photographic lens stands opposite each other to the notch (15c) in the housing of the camera body electric connector, and the body-side movable contact unit (14) with a large amount of projection of the camera body stands opposite each other to the notch (5c) in the housing of the photographic lens electric connector. In addition, since the lens-side fixed contact unit (4) with a small amount of projection of the photographic lens stands opposite each other to the body-side fixed contact unit (13) with a small amount of projection of the camera body at this time, and is able to smoothly stand opposite without any interference, the mount surfaces of the two abut to each other.

When rotating the photographic lens at a specified angle in the mounting direction until the photographic lens abuts on a limit member (7) for stop, a collar (6) of the photographic lens and a collar (16) of the camera body overlap each other, and are fastened by means of a well-known mechanism to complete the mounting.

At this time, the lens-side movable contact unit (3) of the photographic lens stands opposite each other to the body-side fixed contact unit (13) of the camera body for abutment, and is pressed by an outward elastic force energized by a spring unit (3a) for electric connection. The lens-side fixed contact unit (4) of the photographic lens stands opposite each other to the body-side movable contact unit (14) of the camera body for abutment, and is pressed by an inward elastic force energized by a spring unit (14b) for electric connection. The moment the photographic lens has been fastened to the camera body to complete the mounting, a circuit (not shown) is closed to enable communications between electric elements of the two.

DESCRIPTION OF THE PREFERRED EMBODIMENTS

An embodiment of the present invention will be described referring to FIGS. 1 to 5 and FIG. 9.

Figure 1:
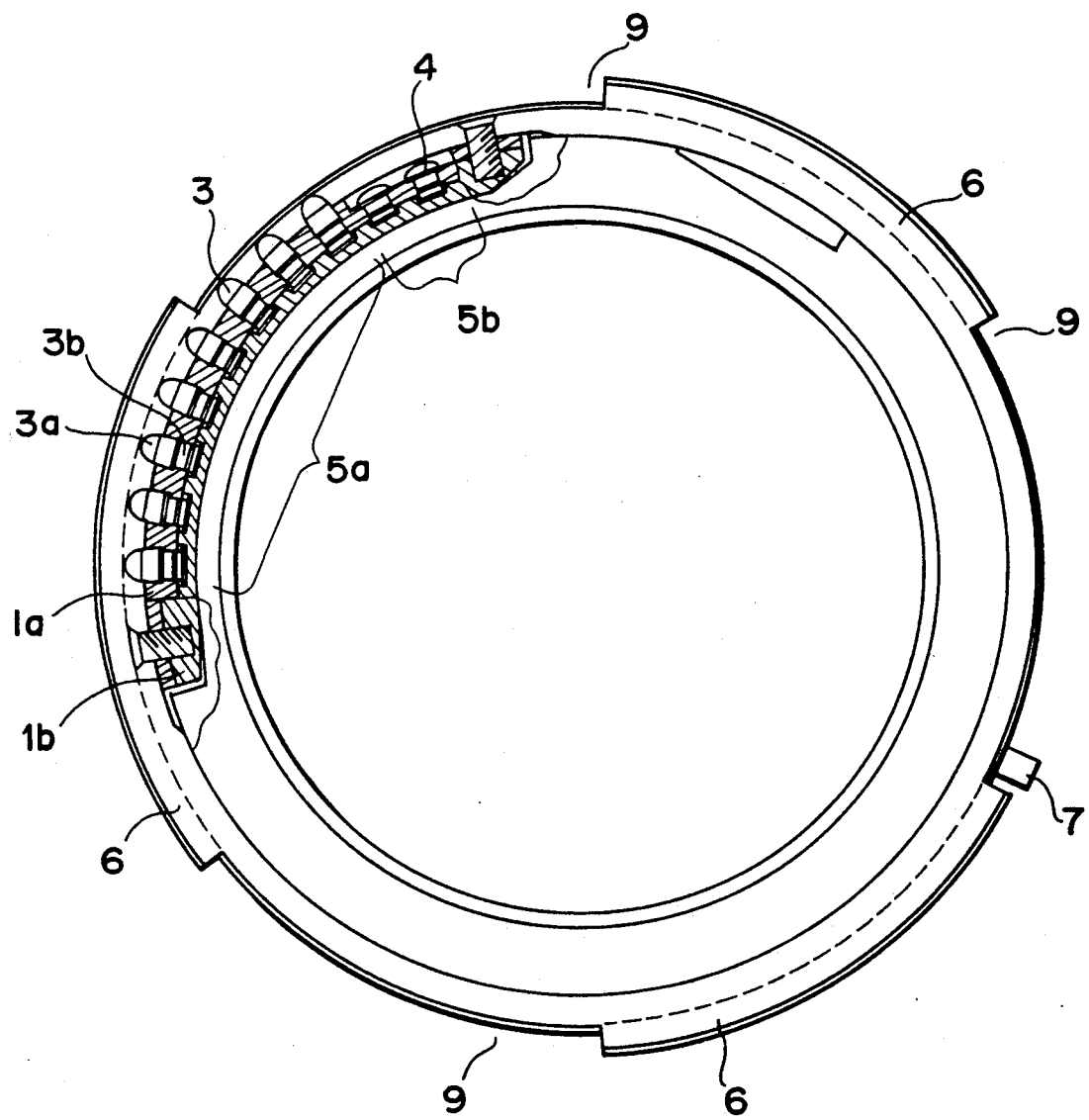
FIG. 1 is a transverse sectional view according to an embodiment of the present invention.
Figure 2A:
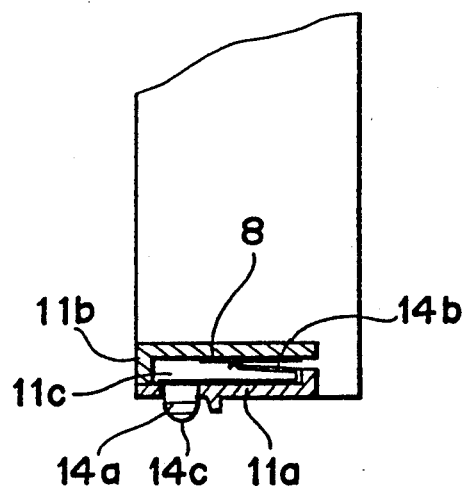
FIGS. 2A and 2B are vertical sectional views of a body-side movable contact unit and a body-side fixed contact unit.
Figure 2B:
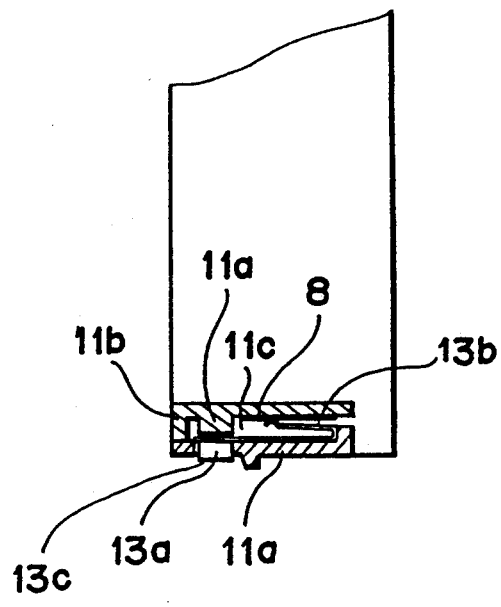
Figure 3A:
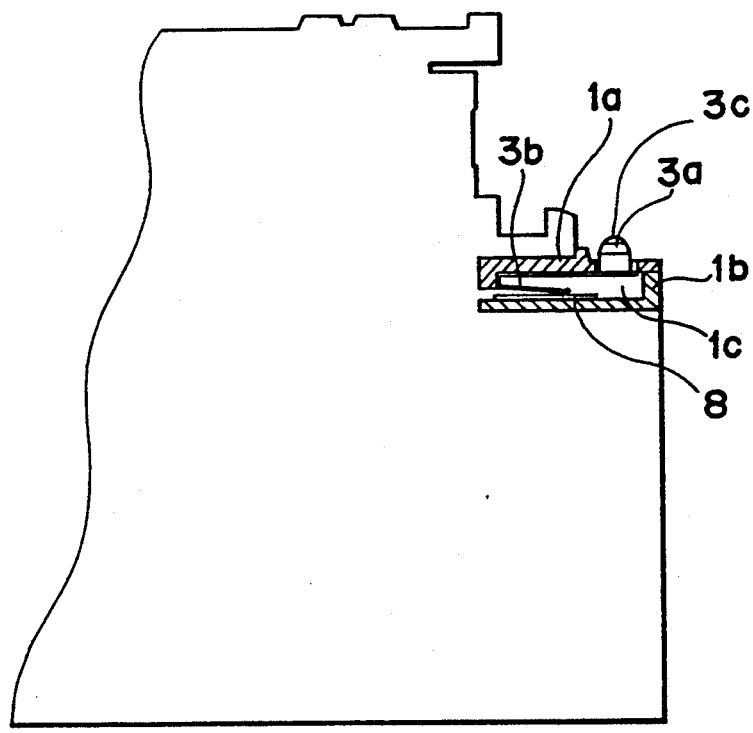
FIGS. 3A and 3B are vertical sectional views of a lens-side movable contact unit and a lens-side fixed contact unit.
Figure 3B:
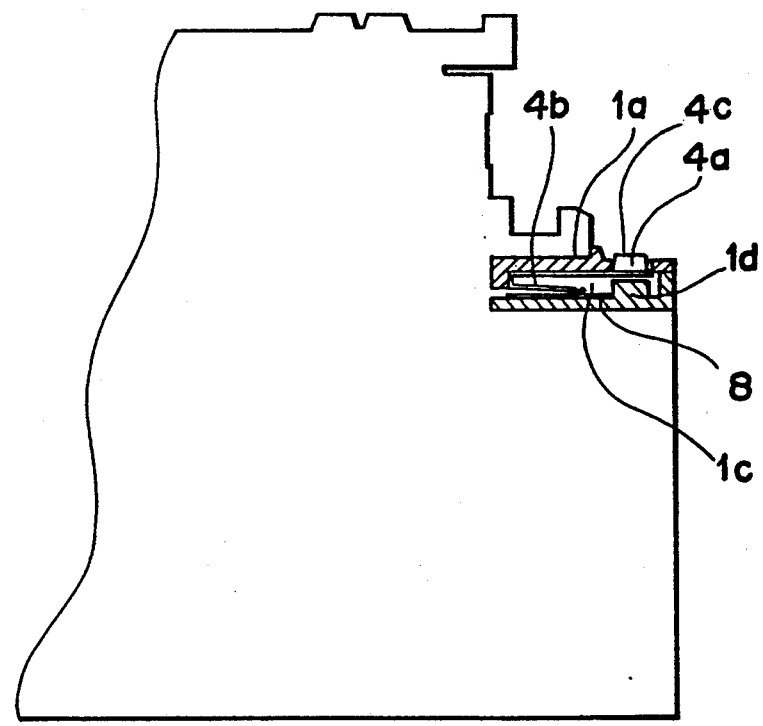
Figure 4:
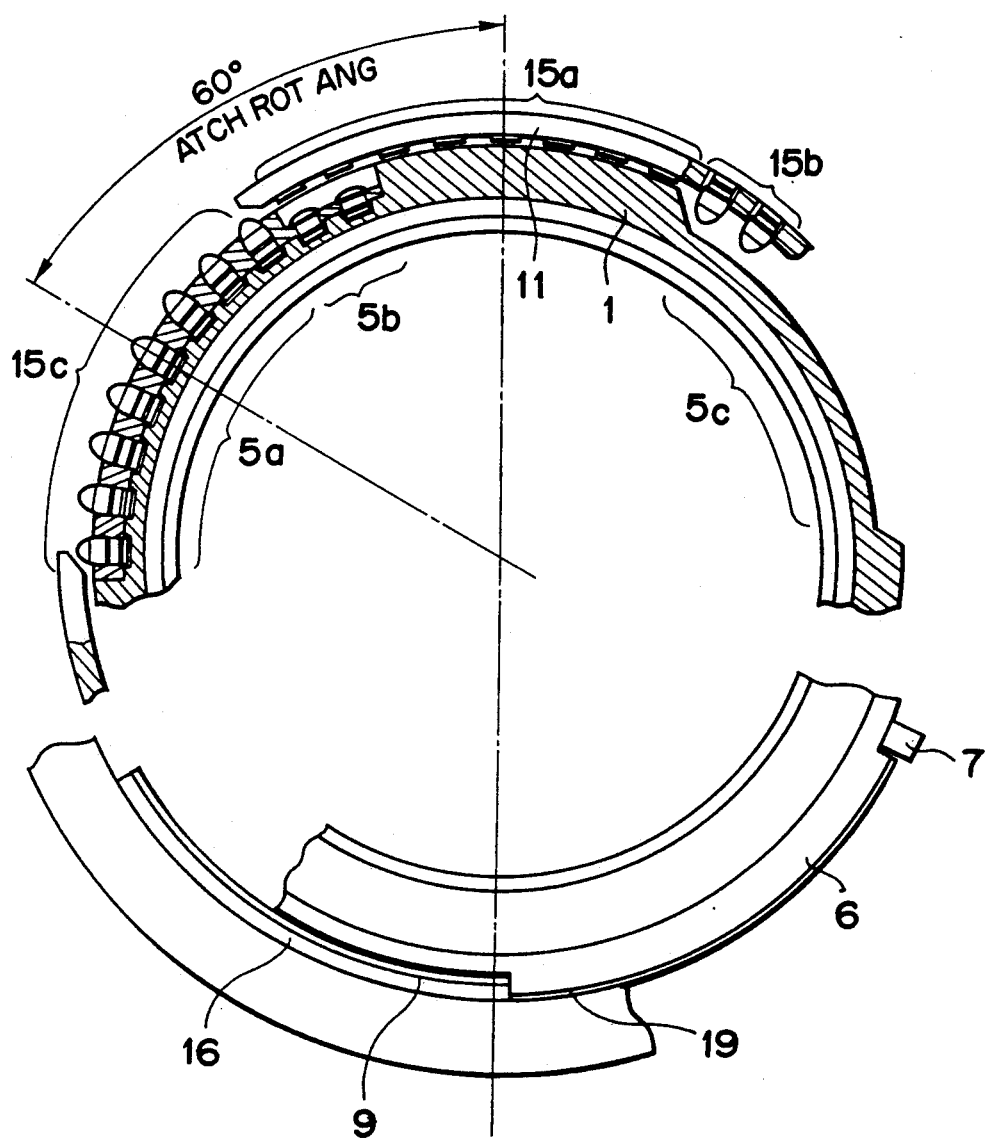
FIG. 4 is a transverse sectional view showing a state when mounted for use.
Figure 5:
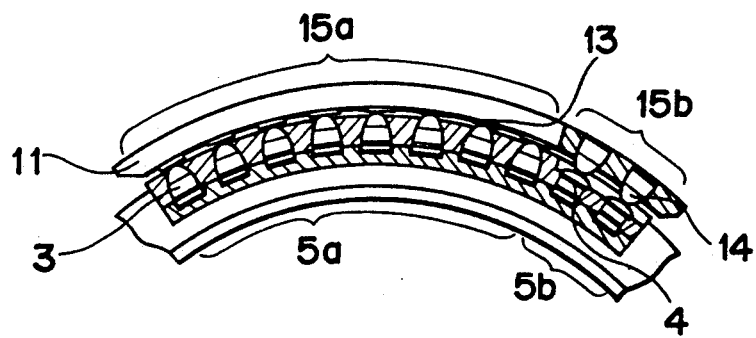
FIG. 5 is a transverse sectional view showing a state when just mounted.
Figure 6:
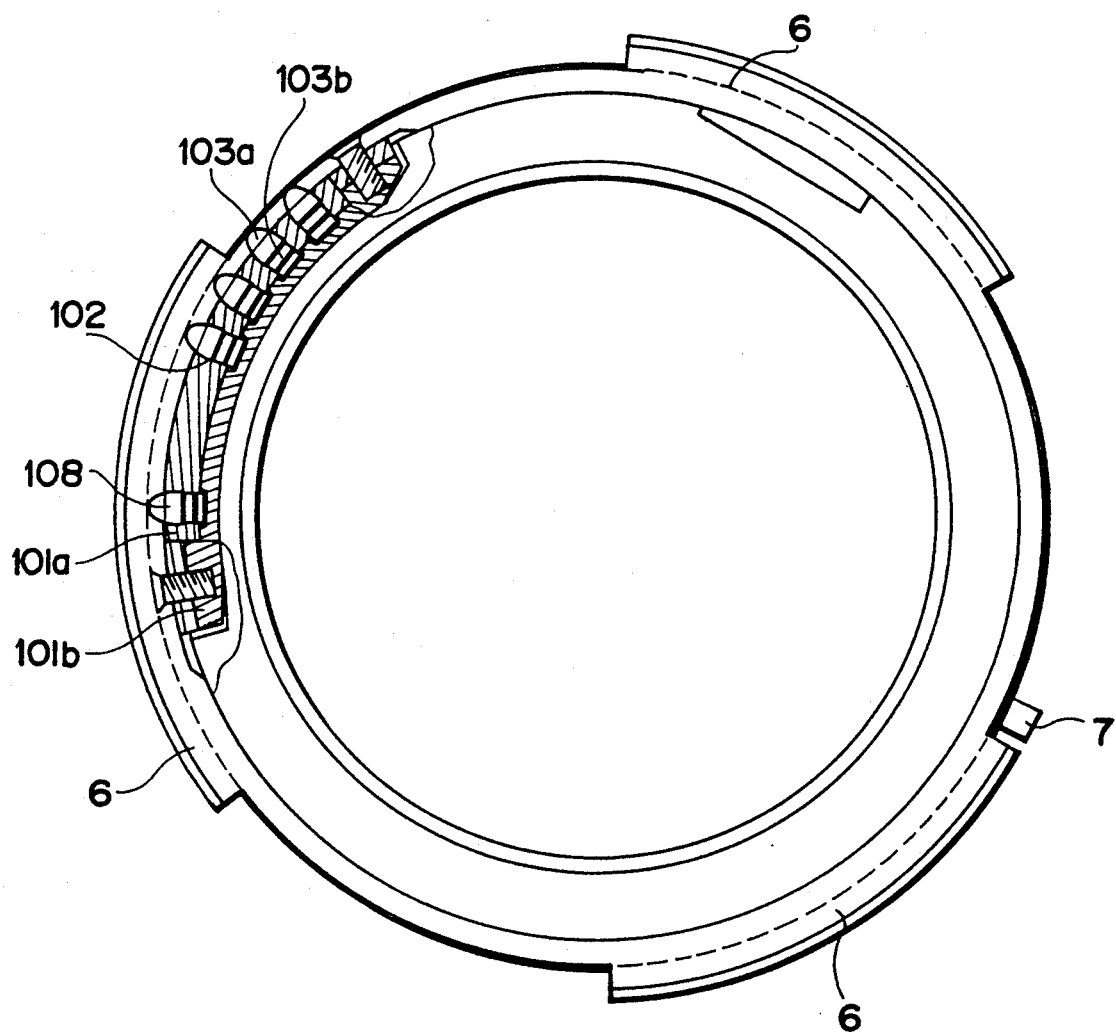
FIG. 6 is a transverse sectional view showing conventional example.
Figure 7:
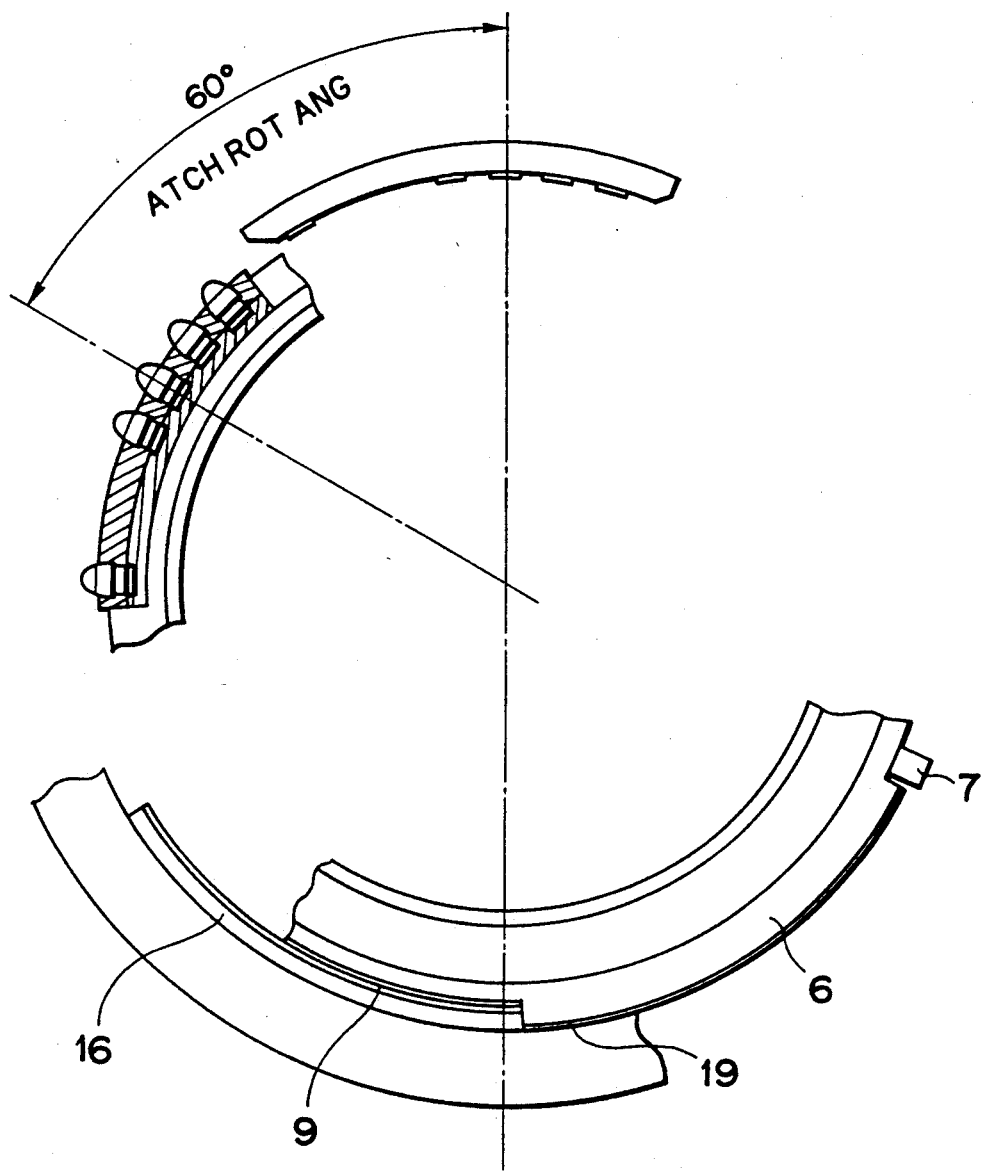
FIG. 7 is a transverse sectional view showing a state of a conventional example when mounted for use.
Figure 8:
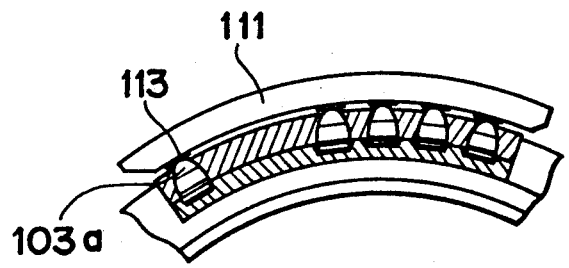
FIG. 8 is a transverse sectional view showing a state of a conventional example when just mounted.

FIG. 1 is a transverse sectional view of a photographic lens according to an embodiment of the present invention. FIGS. 2A and 2B are vertical sectional views of a body-side movable contact unit and body-side fixed contact unit of a camera body. FIGS. 3A and 3B are vertical sectional views of a lens-side movable contact unit and lens-side fixed contact unit of a photographic lens. FIG. 4 is a transverse sectional view showing a state when both mount surfaces have been allowed to stand opposite each other to mount a photographic lens to the camera body. FIG. 5 is a transverse sectional view showing a state when the photographic lens has been mounted to the camera body.

First, the position of a contact unit to be provided at the housing of an electric connector will be described.

FIG. 4 is a transverse sectional view of the vicinity of the contact unit when, in a layout where the camera body is on this side and the photographic lens is on the other side, both mount surfaces have been allowed to stand opposite each other for mounting, and when the mounting has been completed.

As shown in FIGS. 4 and 5, a housing (11) of the camera body electric connector has a portion (15b) to locate the body-side movable contact unit (14), a portion (15a) to locate the body-side fixed contact unit (13) and a notch (15c). The angles, which these three portions (15a, 15b and 15c) occupy the circumference, correspond to the respective angles of mounting.

At the portion (15b) to locate the body-side movable contact unit (14), the body-side movable contact unit (14) has been located to project the head in the radiating direction from the housing unit (11).

At the portion (15a) to locate the body-side fixed contact unit (13), the body-side fixed contact unit (13) has been located to project the head in the radiating direction from the housing unit (11).

A housing (1) of the photographic lens electric connector has a portion (5a) to locate the lens-side movable contact unit (3), a portion (5b) to locate the lens-side fixed contact unit (4) and a notch (5c). The angles, which these three portions (5a, 5b and 5c) occupy the circumference, correspond to the respective angles of mounting.

At the portion (5a) to locate the lens-side movable contact unit (3), the lens-side movable contact unit (3) has been located to project the head in the radiating direction from the housing unit (1).

At the portion (5b) to locate the lens-side fixed contact unit (4), the lens-side fixed contact unit (4) has been located to project the head in the radiating direction from the housing unit (1).

To mount the body-side movable contact unit (14) of the camera body to the notch (5c) in the housing (1) of the photographic lens electric connector, and to mount the lens-side movable contact unit (3) of the photographic lens to the notch (15c) in the housing (1) of the camera body electric connector, the body-side movable contact unit (14) and the lens-side movable contact unit (3) have been located only at the respective corresponding positions when both mount surfaces have been allowed to stand opposite each other.

The structure of the contact unit will be described.

FIGS. 2A and 2B show vertical sectional views of the camera body-side movable contact unit and body-side fixed contact unit respectively. The body-side movable contact unit (14) of the camera body is housed in a holding unit (11c) provided within the housing unit (11) of the camera body, and its head (14c) projects from a concave hole (not shown) provided radiately inward with the optical axis as the center. The body-side movable contact unit (14) consists of a contact member (14a) having a spring unit (14b), and is connected with a circuit substrate (8).

The amount of projection of a head (14c) of the body-side movable contact unit (14) is such a size as not to come into contact with the notch (5c) in the housing (1) of the photographic lens electric connector during mounting. But, after the mounting, it is such a size as to be brought into contact with the head (4c) of the lens-side fixed contact unit (4) with a small amount of projection from the photographic lens electric connector energized by a spring unit (14b). However, the head (14c) of the body-side movable contact unit (14) interfere with a head (3c) of the lens-side movable contact unit (3) with a large amount of projection each other because it is too large.

The body-side fixed contact unit (13) is housed in a holding unit (11c) provided within the housing unit. (11), and its head (13c) projects from a concave hole (not shown). The body-side fixed contact unit (13) consists of a contact member (13a) having a spring unit (13b), and is connected with a circuit substrate (8).

The amount of projection of a head (13c) of the body-side fixed contact unit (13) is such a size as to be brought into contact with the head (3c) of the lens-side movable contact unit (3) with a large amount of projection from the photographic lens electric connector energized by a spring unit (13b) after mounting. However, the head (13c) of the body-side fixed contact unit (13) is such a size as not to come into contact with the head (4c) of the lens-side fixed contact unit (4) with a small amount of projection.

FIGS. 3A and 3B are vertical sectional views of lens-side movable contact unit and lens-side fixed contact unit of the photographic lens respectively.

The lens-side movable contact unit (3) of the photographic lens is housed in a holding unit (1c) provided at the housing unit (1) of the photographic lens, and its head (3c) projects from a concave hole (not shown) provided radiately outward with the optical axis as the center. The lens-side movable contact unit (3) consists of a contact member (3a) having a spring unit (3b), and is connected with the circuit substrate (8).

The amount of projection of a head (3c) of the lens-side movable contact unit (3) is such a size as not to come into contact with the notch (15c) in the housing (11) of the camera body electric connector during mounting. But, after mounting, it is such a size as to be brought into contact with the head (13a) of the body-side fixed contact unit (13) with a small amount of projection from the camera body electric connector energized by a spring unit (3b). However, the head (3c) of the lens-side movable contact unit (3) interferes with a head (14c) of the body-side movable contact unit (14) with a large amount of projection each other because it is too large.

The lens-side fixed contact unit (4) is housed in a holding unit (1c) provided at the housing unit (1), and its head (4c) projects from a concave hole (not shown). The lens-side fixed contact unit (4) consists of a contact member (4a) having a spring unit (4b), and is connected with a circuit substrate (8).

The amount of projection of a head (4c) of the lens-side fixed contact unit (4) is such a size as to be brought into contact with the head (14c) of the body-side movable contact unit (14) with a large amount of projection from the camera body electric connector energized by a spring unit (4b) after mounting. However, the amount of projection of the head (4c) of the lens-side fixed contact unit (4) is such a size as not to come into contact with the head (13c) of the body-side fixed contact unit (13) with a small amount of projection.

The range, within which the body-side movable contact unit (14) and the lens-side movable contact unit (3) are located adjacent to each other, is within an angle of rotation in mounting the photographic lens.

In this embodiment, the angle of rotation in mounting is 60°.

According to this embodiment, in the body-side fixed contact member (13a) and the lens-side fixed contact member (4a), the amounts of stroke of the spring units (14b) and (4b) in the radiating direction inward are controlled by projections (11d) and (1d) provided within the housing units (11) and (1). However, these are not always required.

The collar and notch provided on the mount surface to mount the photographic lens to the camera body for seuring will be described.

On the mount surfaces of the camera body and the photographic lens, collars (16) and (6) and notches (19) and (9) are provided at three places each respectively. By the collars (16) and (6) at three places and the notches (19) and (9) at three places, the circle is almost divided into six equal parts of about 60° each.

When both mount surfaces are allowed to stand opposite each other to mount the photographic lens to the camera body, the collars (16) and (6) and the notches (9) and (19) in the mount surfaces of the photographic lens and the camera body stand opposite each other respectively to allow both mount surfaces to contact each other. At this time, these are exactly positioned to prevent erroneous mounting, and the angle of rotation in mounting is determined.

The rotation limiting member (7) is provided at the side of the mount surface of the photographic lens. When both mount surfaces are allowed to stand opposite each other for rotation to mount the photographic lens to the camera body, the rotation limiting member (7) rotates until it abuts on a rotation limiting member (not shown) of the camera body, stops when it is limited, and is set up at a position where the mounting is completed.

The operation when the electric connector of the above-mentioned comprised photographic lens and camera body is mounted to the photographic lens will be described referring to FIGS. 4 and 5.

To mount the photographic lens to the camera body, allow the photographic lens collar (6) to stand opposite each other to the camera body notch (19), and allow the photographic lens notch (9) to stand opposite each other to the camera body collar (16), and then avoid mutual interference to allow both mount surfaces to approach to each other.

At this time, since the body-side movable contact unit (13) of the camera body stands opposite to the notch (5c) in the photographic lens housing, and does not stand opposite to the lens-side movable contact unit (14) and lens-side fixed contact unit (13) of the photographic lens, no mutual interference occurs. Since, on the other hand, the lens-side movable contact unit (3) of the photographic lens stands opposite to the notch (15c) in the camera body housing, and does not stand opposite to the body-side movable contact unit (14) and the body-side fixed contact unit (13) of the camera body, no mutual interference occurs, but both mount surfaces can smoothly come into contact with each other.

Then rotate the photographic lens in the direction of rotation for mounting to allow to abut on the limiting member (7), and the collars (6 and 16) of both the camera body and the photographic lens will overlap each other, and be fastened to each other through a well-known mechanism to complete the mounting. At this time, the lens-side movable contact unit (3) of the photographic lens stands opposite each other to the body-side fixed contact unit (13) of the camera body, and the lens-side fixed contact unit (4) of the photographic lens stands opposite each other to the body-side movable contact unit (14) of the camera body for abutment. These are pressed by outward elastic force energized by the spring for electric connection respectively.

Figure 9A:
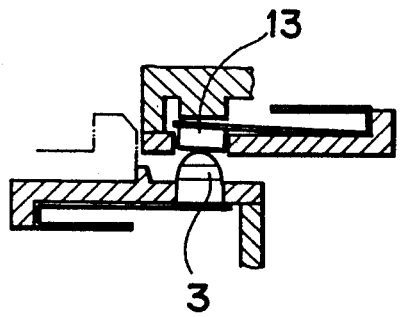
FIGS. 9A, 9B and 9C are views showing a state when each contact unit stands opposite each other.
Figure 9B:
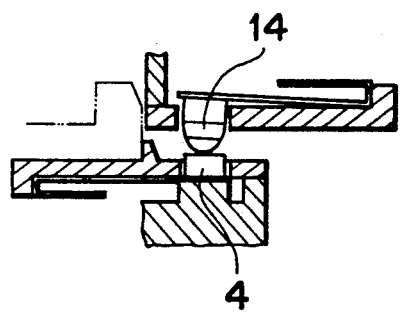
Figure 9C:
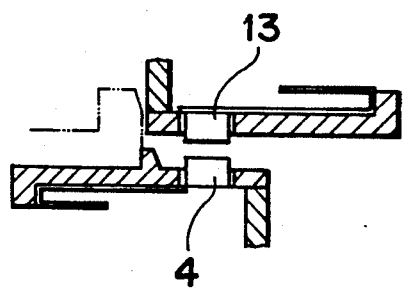

A state, when each contact unit has stood opposite each other, is shown in FIGS. 9A, 9B and 9C. FIG. 9A shows that the lens-side movable contact unit (3) stands opposite each other to the body-side fixed contact unit (13) and both are in contact. FIG. 9B shows that the lens-side fixed contact unit (4) stands opposite each other to the body-side movable contact unit (14) and both are in contact. FIG. 9C shows that the lens-side fixed contact unit (4) is not in contact with the body-side fixed contact unit (13) although both stand opposite each other. Since the lens-side movable contact unit (3) avoids standing opposite each other with to the body-side movable contact unit (14), its state cannot be shown.

When the photographic lens and the camera body are fastened to complete the mounting, an electric circuit (not shown) between the two is closed at this position.

The lens-side movable contact unit (3) and the lens-side fixed contact unit (4) of the photographic lens, and the body-side fixed contact unit (13) and the body-side movable contact unit (14) are thus electrically connected respectively, and the communication between each electric element of the photographic lens and the camera body becomes possible through a plurality of contacts provided within a range beyond the angle of rotation in mounting.

When the camera body is mounted to the photographic lens according to this embodiment, the photographic lens is allowed to stand opposite each other to the camera body to smoothly make both mount surfaces contact to each other, and when the amounting is completed by fastening, each contact unit securely makes electric connection through the elastic force mutually energized, enabling a great deal of communications between electric elements of the two.

Although the camera body and the photographic lens have been described, it goes without saying that it can be likewise enforced also with the camera accessories. In some camera accessories, they abut on the camera body on one mount surface, and abut on the photographic lens on the other mount surface. The camera body and the photographic lens are connected through the camera accessories.

For the contact unit, the same one as was conventionally used can be partially used. For the photographic lens, camera body, accessories, etc., the interchangeability between conventional ones and those based on the present invention can be secured.

Since conventional parts can be used, the electric connecting apparatus can be manufactured at a low cost.

According to the present invention, since the photographic lens and the camera body can smoothly stand opposite each other and both mount surfaces can be brought into contact each other during mounting, the contact unit, etc. will not be damaged.

When mounting has been completed, the contact unit of the photographic lens abuts on that of the camera body, and an inward elastic force energized by the spring presses both into contact for electric connection. Therefore, it is possible to provide a large number of contact units on the connector for the camera body and the photographic lens beyond the range of angle of rotation. Accordingly, the increasing communications between the photographic lens and the camera body could be secured using a large number of electric contact units.

Further, since those contact units, which were conventionally used, can be used, the interchangeability between conventional photographic lenses, camera bodies, accessories, etc. and those based on the present invention could be secured.

Since conventional parts can be used, the electric connecting apparatus can be manufactured at a low cost.

What is claimed is:

1. An electric connecting apparatus for a camera system including a camera body and lens means attachable to the camera body, in which the camera body and the lens means are constructed so that to attach the lens means to the camera body the lens means is aligned with the camera body at an initial position and is moved from the initial position through a predetermined attachment movement angle relative to the camera body, comprising:

contact means on said camera body including a movable contact unit and a relatively fixed contact unit; and contact means on said lens means including a movable contact unit and a relatively fixed contact unit;

the movable contact unit of each of said camera body and said lens means extending circumferentially over an angle that is less than said attachment movement angle, the contact means of each of said camera body and said lens means extending circumferentially over a total angle that exceeds said attachment movement angle, and the contact means of said camera body and said lens means being disposed so that at said initial position the contact means of said camera body is free of interference with said lens means and the contact means of said lens means is free of interference with said camera body, and so that after said attachment movement the movable contact unit of said camera body engages the relatively fixed contact unit of said lens means and the movable contact unit of said lens means engages the relatively fixed contact unit of said camera body.

2. An electric connecting apparatus according to claim 1, wherein said movable contact units are disposed so that during said attachment movement the movable contact units do not engage one another.

3. An electric connecting apparatus according to claim 1, wherein said movable contact units comprise radially moving spring-biased contact elements.

4. An electric connecting apparatus according to claim 1, wherein each of said camera body and said lens means has circumferential collar means and circumferential notch means, collar means of said lens means being aligned with notch means of said camera body and collar means of said camera body being aligned with notch means of said lens means when said lens means is in said initial position.

5. An electric connecting apparatus according to claim 4, wherein said movable contact unit of said lens means is aligned with notch means of said camera body and said movable contact unit of said camera body is aligned with notch means of said lens means when said lens means is in said initial position.

6. An electric connecting apparatus for lens means freely mountable to a camera body by alignment with the camera body at an initial position and movement from the initial position through a predetermined attachment movement angle relative to the camera body, said camera body having contact means thereon including a movable contact unit and a relatively fixed contact unit, the movable contact unit extending circumferentially over an angle that is less than said attachment movement angle, the contact means of said camera body extending circumferentially over a total angle that exceeds said attachment movement angle, comprising:

contact means on said lens means including a movable contact unit and a relatively fixed contact unit; the movable contact unit of said lens means extending circumferentially over an angle that is less than said attachment movement angle, the contact means of said lens means extending circumferentially over a total angle that exceeds said attachment movement angle, the contact means of said lens means being disposed relative to the contact means of said camera body so that at said initial position the contact means of said camera body is free of interference with said lens means and the contact means of said lens means is free of interference with said camera body, and so that after said attachment movement the movable contact unit of said camera body engages the relatively fixed contact unit of said lens means and the movable contact unit of said lens means engages the relatively fixed contact unit of said camera body.

7. An electric connecting apparatus according to claim 6, wherein said movable contact units are disposed so that during said attachment movement the movable contact units do not engage one another.

8. An electric connecting apparatus according to claim 6, wherein said movable contact units comprise radially moving spring-biased contact elements.

9. An electric connecting apparatus according to claim 6, wherein each of said camera body and said lens means has circumferential collar means and circumferential notch means, collar means of said lens means being aligned with notch means of said camera body and collar means of said camera body being aligned with notch means of said lens means when said lens means is in said initial position.

10. An electric connecting apparatus according to claim 9, wherein said movable contact unit of said lens means is aligned with notch means of said camera body and said movable contact unit of said camera body is aligned with notch means of said lens means when said lens means is in said initial position.

11. An electric connecting apparatus for an accessory freely mountable to a camera body by alignment with the camera body at an initial position and movement from the initial position through a predetermined attachment movement angle relative to the camera body, said camera body having contact means thereon including a movable contact unit and a relatively fixed contact unit, the movable contact unit extending circumferentially over an angle that is less than said attachment movement angle, the contact means of said camera body extending circumferentially over a total angle that exceeds said attachment movement angle, comprising:

contact means on said accessory including a movable contact unit and a relatively fixed contact unit; the movable contact unit of said accessory extending circumferentially over an angle that is less than said attachment movement angle, the contact means of said accessory extending circumferentially over a total angle that exceeds said attachment movement angle, the contact means of said accessory being disposed relative to the contact means of said camera body so that at said initial position the contact means of said camera body is free of interference with said accessory and the contact means of said accessory is free of interference with said camera body, and so that after said attachment movement the movable contact unit of said camera body engages the relatively fixed contact unit of said accessory and the movable contact unit of said accessory engages the relatively fixed contact unit of said camera body.

12. An electric connecting apparatus according to claim 11, wherein said movable contact units are disposed so that during said attachment movement the movable contact units do not engage one another.

13. An electric connecting apparatus according to claim 11, wherein said movable contact units comprise radially moving spring-biased contact elements.

14. An electric connecting apparatus according to claim 11, wherein each of said camera body and said accessory has circumferential collar means and circumferential notch means, collar means of said accessory being aligned with notch means of said camera body and collar means of said camera body being aligned with notch means of said accessory when said accessory is in said initial position.

15. An electric connecting apparatus according to claim 14, wherein said movable contact unit of said accessory is aligned with notch means of said camera body and said movable contact unit of said camera body is aligned with notch means of said accessory when said accessory is in said initial position.

* * * * *